United States Patent [19]

Yukuta et al.

[11] 3,968,084

[45] July 6, 1976

[54] CURABLE COMPOSITION OF EPOXY RESIN AND CURED PRODUCT THEREOF

[75] Inventors: Toshio Yukuta, Kodaira; Takashi Ohashi, Iruma, both of Japan

[73] Assignee: Bridgestone Tire Company Limited, Tokyo, Japan

[22] Filed: Nov. 25, 1974

[21] Appl. No.: 527,081

[30] Foreign Application Priority Data
Nov. 28, 1973   Japan.............................. 48-132550

[52] U.S. Cl............................. 260/47 EN; 260/2 N; 260/2 BP; 260/59 EP; 260/77.5 NC
[51] Int. Cl.².................. C08G 59/14; C08G 59/22; C08G 59/40
[58] Field of Search ............. 260/47 EN, 2 N, 2 BP, 260/830 TW, 77.5 NC, 78.4 EP, 59, 340.7, 88.3 A

[56] References Cited
UNITED STATES PATENTS
3,467,707   9/1969   Aelony .......................... 260/47 EN

*Primary Examiner*—Murray Tillman
*Assistant Examiner*—T. Pertilla
*Attorney, Agent, or Firm*—Brooks Haidt Haffner & Delahunty

[57] ABSTRACT

A curable epoxy resin composition containing an epoxy resin and, as a curing agent, 3,9-bis(2-hydrazidoethyl)-2,4,8,10-tetraoxaspiro-[5,5]-undecane, as well as the cured resins produced from such composition, the curable resin being useful for paints, adhesives, and molded articles.

6 Claims, No Drawings

3,968,084

CURABLE COMPOSITION OF EPOXY RESIN AND CURED PRODUCT THEREOF

BACKGROUND OF THE INVENTION

1. Field of the Invention

The present invention relates to a curable composition of epoxy resin and cured product thereof.

2. Description of the Prior Art

Epoxy resins have been recently used in various industrial fields such as paints, electric parts, construction materials, adhesives and shaped articles owing to their excellent physical properties.

In general, epoxy resins are not used as the resin alone, but usually used in a form of a thermosetting resin having a three dimensional structure by curing with a curing agent. There have been known many curing agents. Properties of the cured resin are affected by the curing agent used. In other words, the pot life, viscosity, compatibility, degree of dispersion, curing temperature, curing time, and degree of scorching during curing, of the mixture of epoxy resin and curing agent largely depend upon the type of the curing agent. Therefore, selection of an appropriate curing agent is very important to produce a cured epoxy resin of desired properties.

As a curing system of epoxy resins, two-part systems have been generally used which comprise an epoxy resin component such as bisphenol-A type resin and a curing agent component such as a polyamine or an acid anhydride.

Much attention has been recently devoted to one-part systems of epoxy resin composition using a latent curing agent.

The one-part system of epoxy resin composition has much commercial significance as compared to the two-part system. A one-part system serves to eliminate time consuming measuring and mixing operations at the point of ultimate consumption, danger caused by error in measuring or insufficient mixing, and waste due to mixing too much.

As latent curing agents, aliphatic dicarboxylic acid dihydrazide, dicyandiamide and their mixtures are known (U.S. Pat. Nos. 2,847,396 and 3,294,748).

Amino acid hydrazide is also reported in David Aelong: J. Appl. Polymer Sci., 13, 227 (1969). Aliphatic or aromatic dicarboxylic acid dihydrazides have generally high melting points and many of them are apt to decompose at the melting point.

Moreover, since compositions containing the above well known curing agent are apt to scorch owing to exothermic reaction upon curing, the pot life is short, homogeneous mixing is not possible in a short time, and it is difficult to shape thick articles in a homogeneously cured state.

3,9-Bis(3-aminopropyl)-2,4,8,10-tetraoxaspiro-[5,5]-undecane is also known as a curing agent to give a tough epoxy resin. However, this compound is of excessively large reactivity, short pot life and offensive odor. In order to eliminate the drawbacks, the diamine is modified with a monoepoxide and the amino groups are masked to liquefy the diamine. However, such modification can not remove the drawbacks inherent to amine curing agents, for example, undesirable crystallization during storage.

SUMMARY OF THE INVENTION

According to the present invention, there is provided a curable composition of epoxy resin which comprises an epoxy resin having one or more epoxy groups per molecule and 3,9-bis(2-hydrazidoethyl)-2,4,8,10-tetraoxaspiro-[5,5]-undecane as a curing agent.

According to another aspect of the present invention, there is provided a curing agent for an epoxy resin having at least one epoxy group per molecule, said curing agent comprising 3,9-bis(2-hydrazidoethyl)-2,4,8,10-tetraoxaspiro-[5,5]-undecane.

According to a further aspect of the present invention, there is provided a cured epoxy resin by curing in the presence of 3,9-bis(2-hydrazidoethyl)-2,4,8,10-tetraoxaspiro-[5,5]-undecane as a curing agent.

An object of the present invention is to provide an improved curing agent for epoxy resins.

Another object of the present invention is to provide an epoxy resin cured in the presence of the improved curing agent.

A further object of the present invention is to provide a curable composition of epoxy resin which can produce a transparent, non-discoloring and tough cured epoxy resin.

Still another object of the present invention is to provide a curable composition of epoxy resin which exhibits a sufficiently long pot life and can be easily handled.

A still further object of the present invention is to provide a curable composition of epoxy resin which can produce a cured epoxy resin of an excellent weather proofing property and toughness.

Still another object of the present invention is to provide a curable composition of epoxy resin which is non-poisonous and free from offensive odor.

A still further object of the present invention is to provide a curable composition of epoxy resin which is capable of shaping a thick article.

DESCRIPTION OF THE PREFERRED EMBODIMENTS

The epoxy resin to be used in the present invention is a resin having one or more epoxy groups, and preferably two or more epoxy groups, per molecule.

As the epoxy resins, there may be mentioned styrene oxide resin, butadiene monoxide resin, epoxystearate resin, bisphenol-A type epoxy resins, phthalic acid glycidyl ester type epoxy resins, polyalkylene ether type epoxy resins, aliphatic or alicyclic diepoxy compounds, the condensates of polyhydroxy alcohol with epichlorohydrin, tris-2,3-epoxypropyl isocyanurate, novolak type epoxy resins and the like. Among them, bisphenol-A type epoxy resins or the condensates of polyhydric alcohol with epichlorohydrin are particularly preferable. However, the epoxy resin to be used in the present invention is not limited only to those described above, but their derivatives and the combination of two or more resins described above can be also used.

The curing agent to be used in the present invention is 3,9-bis(2-hydrazidoethyl)-2,4,8,10-tetraoxaspiro-[5,5]-undecane, which may be prepared by reacting 3,9-bis(2-carbomethoxyethyl)-2,4,8,10-tetraoxaspiro-[5,5]-undecane with hydrazine hydrate as illustrated below. A mixture of 1.0 mole of 3,9-bis(2-carbomethoxyethyl)-2,4,8,10-tetraoxaspiro-[5,5]-undecane and 2.0 moles of hydrazine hydrate is heated under reflux in methanol for about 5 hours.

Thereafter, the unreacted excess hydrazine hydrate and methanol are removed under reduced pressure by means of a rotary evaporator and the product is dried under vacuum to obtain white crystalline solid of high purity in high yield. The product may further be purified by recrystallization using purified methanol.

In the present invention, it is desirable to use the recrystallized product as the curing agent, but the crude product may, of course, be applicable.

The curing agent to be used in the present invention is non-hygroscopic, white crystalline solid having a melting point of 155° – 156°C and can be used in the optionally pulverized form. Further, it acts as a latent curing agent to give an excellent one-part system of epoxy resin composition.

The equivalent weight ratio of the curing agent to the epoxy resin is within the range of from 0.80 to 1.20. Particularly, the equivalent weight ratio of from 0.95 to 1.05 is preferable.

In order to mix the epoxy resin with the curing agent to shape them, a conventional method may be utilized in which a powdered curing agent and epoxy resin are compounded with each other to produce a curable composition of epoxy resin.

Epoxy resin is sufficiently mixed with the finely pulverized curing agent to get a homogeneous composition. The composition thus obtained is cast into a slab mold which has previously been coated with a releasing agent and heated at a curing temperature to obtain a cured resin. Such cured resin may be obtained by another method. That is, epoxy resin and the curing agent are placed in a separable flask equipped with a stirrer, thereafter, the mixture is stirred under reduced pressure to defoam it and to get a homogeneous dispersion. The dispersion is heated up to the melting point of said curing agent to make the dispersion into a homogeneous solution by melting said curing agent. The solution is cast into a slab mold to obtain a cured resin plate after the curing process. The latter method may give a clear, homogeneous and transparent cured resin.

The curing temperature to be adopted in the present invention is usually within the range of from 100° to 180°C. The range of 130° – 150°C is more preferable.

To obtain the cured and reinforced epoxy resin in the present invention, various kinds of filler, pigments, softening agents, moderators and diluents may be compounded.

Many excellent effects can be advantageously attained by utilizing the curing agent of the present invention in the composition, which are shown as follows.

Handling and compounding of the composition of the present invention are easier than those of the composition prepared by using the conventional curing agents because of its non-poisonous property and absence of offensive odor. In addition, the curing agent to be used in the present invention has a lower melting point and exhibits high affinity to epoxy resin than ordinary carboxylic acid dihydrazide.

The composition obtained in the present invention is a homogeneous and one-part system epoxy resin composition. The pot life of the composition is satisfactorily long and it can be cured at any temperature to be adopted and has good scorching stability. Accordingly, the composition obtained in the present invention is useful as the materials for shaping a thick article, that cannot be attained by using the well known typical epoxy resin compositions.

The cured epoxy resin obtained in the present invention is superior in weather proofing, toughness and non-discoloring properties to the conventional epoxy resins. These properties result from the presence of the spiro acetal ring in the molecular structure of the curing agent of the present invention.

The following examples are intended to illustrate the invention and are not be be construed to limit the scope of the invention.

EXAMPLE 1

To a 100 ml. separable flask were added 17.9 g. of Epikote 828 (trade mark, an epoxy resin — a condensate of bisphenol-A with epichlorohydrin, epoxy equivalent: 180 – 200, supplied by Shell Chemical Co.) and then 8.3 g. of finely divided 3,9-bis(2-hydrazidoethyl)-2,4,8,10-tetraoxaspiro-[5,5]-undecane, and mixed thoroughly with a stirrer to disperse it uniformly. The resulting paste-like composition showed excellent storage stability and even after about 3 months a change of viscosity was not observed. 10 g. of the composition was cast into a slab mold which was previously coated with a releasing agent and heated to 150°C, and cured at 150°C for 30 minutes to obtain a clear, transparent and tough cured epoxy resin plate.

EXAMPLE 2

In a manner similar to that described in Example 1, the same composition was cured except that the curing was effected at 140°C for 10 minutes, and a colorless, transparent and tough cured epoxy resin plate was obtained.

EXAMPLE 3

In a 100 ml. separable flask, was placed 17.9 g. of Epikote 828, stirred thoroughly under reduced pressure and heated on an oil bath at 150°C to defoam and reduce the viscosity of said resin. Thereafter, 8.3 g. of finely pulverized 3,9-bis(2-hydrazidoethyl)-2,4,8,10-tetraoxaspiro-[5,5]-undecane was added thereto under successive stirring. After about 4 minutes, the curing agent in the mixture was melted and a clear and homogeneous composition having low viscosity was obtained. The resulting solution was cast into slab mold which was previously coated with a releasing agent and heated to 150°C.

The cast composition was heated at 150°C for 30 minutes in an oven to obtain a cured, colorless, transparent and tough epoxy resin plate.

The resistance to thermal aging of the cured product is as high as that of the product obtained by using a conventional diamine type curing agent and no defect of said product was observed for practical use.

COMPARATIVE EXAMPLE 1

The experiment was carried out according to Example 3 except that 4,4'-diamino diphenylmethane was used instead of 3,9-bis(2-hydrazidoethyl)-2,4,8,10-tetraoxaspiro-[5,5]-undecane.

The cured resin plate thus obtained was discolored to yellow brown and was inferior in toughness to that obtained by Example 3.

EXAMPLE 4

Following the procedure of Example 3 except that 21.05 g. of Nissan Epiol ED-06-100 (trade mark, epoxy resin — a condensate of polyethylene glycol with epichlorohydrin, supplied by Nippon Oils & Fats Company, epoxy equivalent being 421) was used instead of Epikote 828, there was obtained a colorless, transparent and somewhat elastic epoxy resin plate.

On the other hand, a cured epoxy resin plate obtained by a similar procedure except using 4,4'-diamino diphenylmethane as curing agent was inferior in the strength and could not be removed from the mold.

COMPARATIVE EXAMPLE 2

When the procedure of Example 3 was repeated except that sebacic acid dihydrazide was used as the curing agent, scorching began violently after about 5 minutes' heating at 150°C. The product discolored from brown to black color giving off an offensive smell and became a coke-like produce failing to form a cured epoxy resin.

From the result described above, it is clear that the curing agent according to the present invention is superior in scorch stability and processability for making epoxy resin to the conventional curing agent.

We Claim:

1. A curable epoxy resin composition which comprises an epoxy resin having one or more epoxy groups per molecule and 3,9-bis(2-hydrazidoethyl)-2,4,8,10-tetraoxaspiro-[5,5]-undecane in an amount sufficient to act as a curing agent and produce a cured epoxy resin.

2. A curable composition according to claim 1, the amount of 3,9-bis(2-hydrazidoethyl)-2,4,8,10-tetraoxaspiro-[5,5]-undecane to epoxy resin being within the range of from 0.80 to 1.20 equivalent ratio of curing agent to epoxy groups in the epoxy material.

3. A curable composition according to claim 1, in which the amount of 3,9-bis(2-hydrazidoethyl)-2,4,8,10-tetraoxaspiro-[5,5]-undecane to epoxy resin is within the range of from 0.95 to 1.05 equivalent ratio of curing agent to epoxy groups in the epoxy material.

4. A curable composition according to claim 1, said epoxy resin being selected from the class consisting of bis phenol-A epoxy resin, phthalic acid glycidyl ester epoxy resin, the condensate of poly hydroxy alcohol with epichlorohydrin, tris-2,3-epoxy propyl isocyanurate and novolak epoxy resin.

5. A curable composition of epoxy resin which comprises a bis phenol-A epoxy resin or a condensate of polyhydric alcohol with epichlorohydrin and 3,9-bis(2-hydrazidoethyl)-2,4,8,10-tetraoxaspiro-[5,5]-undecane as a curing agent, the equivalent amount of said curing agent to epoxy groups in said epoxy resin being within the range of from 0.95 to 1.05.

6. An epoxy resin which is obtained by curing an epoxy resin having one or more epoxy groups per molecule in the presence of 3,9-bis(2-hydrazidoethyl)-2,4,8,10-tetraoxaspiro-[5,5]-undecane as a curing agent at a temperature of from 100° to 180°C, the amount of the curing agent being sufficient to produce a cured resin.

* * * * *